J. R. TRIGWELL.
HEAD FOR SIPHON BOTTLES AND OTHER VESSELS.
APPLICATION FILED DEC. 18, 1914. RENEWED JUNE 15, 1918.

1,273,955.

Patented July 30, 1918.
2 SHEETS—SHEET 1.

WITNESSES:
John C. Sanders
Dudley B. Howard

INVENTOR:
James Richard Trigwell
BY
ATTY.

J. R. TRIGWELL.
HEAD FOR SIPHON BOTTLES AND OTHER VESSELS.
APPLICATION FILED DEC. 18, 1914. RENEWED JUNE 15, 1918.
1,273,955.
Patented July 30, 1918.
2 SHEETS—SHEET 2.
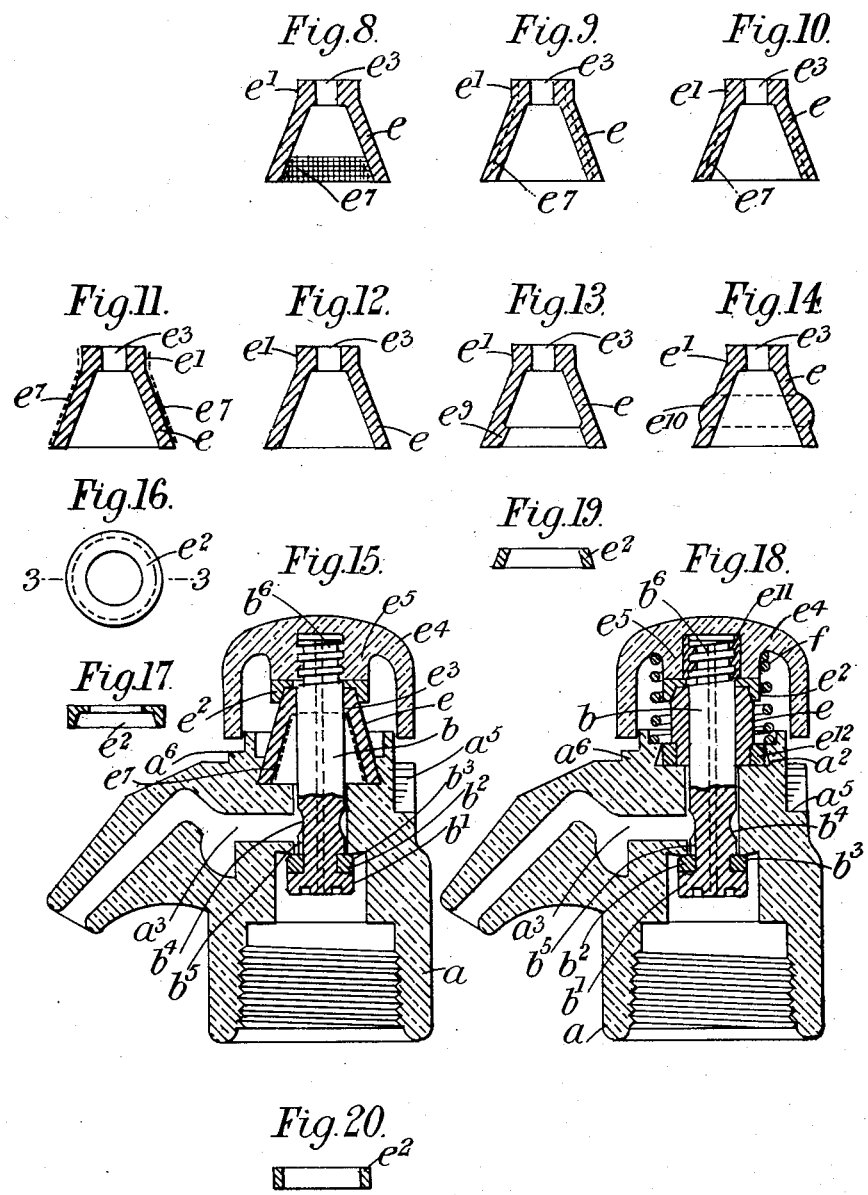

UNITED STATES PATENT OFFICE.

JAMES RICHARD TRIGWELL, OF NORBURY, ENGLAND.

HEAD FOR SIPHON-BOTTLES AND OTHER VESSELS.

1,273,955.　　　　　　Specification of Letters Patent.　　Patented July 30, 1918.

Application filed December 18, 1914, Serial No. 877,893. Renewed June 15, 1918. Serial No. 240,247.

*To all whom it may concern:*

Be it known that I, JAMES RICHARD TRIGWELL, a subject of the King of Great Britain, and residing at Bishops Park Road, Norbury, in the county of Surrey, England, have invented certain new and useful Improvements in or Relating to Heads for Siphon-Bottles and other Vessels, of which the following is a specification.

This invention relates to heads for siphon bottles and other vessels of the class which are chiefly constructed of porcelain or other vitreous material and consists of improvements upon inventions in respect of which Letters Patent were granted to me in Great Britain No. 19239 of 1910, Nos. 510 and 27095 of 1911 and No. 182 of 1913.

The object of said improvements consists principally in preventing leakage past the india rubber spring and the valve.

In carrying the present invention into effect, a vertically movable valve is employed, mounted in an axial cylindrical bore in the body of the head which is formed with a spout the bore of which communicates with that of the body, the valve being preferably constructed of ebonite strengthened by a metal wire arranged axially thereof, said valve being provided with a cap, and is kept closed by an india rubber spring, the lower end of which is received in a recess formed in the upper end of the body of the head and the upper end of the valve stem is surrounded by a ring which is formed inclined on the inner side inwardly from its lower edge and compresses by means of the inclined side the india rubber spring at that point, when the siphon vessel is being charged through the spout, to make a tight joint at its apex.

The wall of the india rubber spring is preferably reinforced by woven fabric or other suitable inextensible material, to prevent undue expansion thereof and is preferably thickened at the base.

The valve is locked against its seat to prevent leakage in transport, and for this purpose the cap of the valve is provided with fingers which normally rest in recesses in the body but upon the cap being rotated to lock the valve they engage the edges of the recesses and ride up them on to a shoulder upon the body, stops being formed thereon to limit the motion of the cap to prevent it becoming unscrewed from the stem of the valve, and in order to prevent distortion of the india rubber spring and the packing on the head of the valve, the upper end of the stem thereof is formed with a screw thread, preferably square, upon which the cap is adapted to rotate easily.

In the accompanying drawings:—

Fig. 8 is a similar view to Fig. 7 illustrating a slight modification in the construction of the conical india rubber spring.

Fig. 9 is a similar view to Fig. 7 illustrating a further slight modification thereof.

Fig. 10 is a similar view to Fig. 7 illustrating a further slight modification thereof.

Fig. 11 is a similar view to Fig. 7 illustrating a further slight modification thereof.

Fig. 12 is a similar view to Fig. 7 illustrating a further slight modification thereof.

Fig. 13 is a similar view to Fig. 7 illustrating a further slight modification thereof.

Fig. 14 is a similar view to Fig. 7 illustrating a further slight modification thereof.

Fig. 15 is a similar view to Fig. 3 illustrating a slight modification in the construction of the cap of the valve in which the ring with inclined inner side is separate therefrom.

Fig. 16 is a plan of the ring with inclined inner side separately.

Fig. 17 is a transverse section taken on the line 3—3 of Fig. 16.

Fig. 18 is a similar view to Fig. 3 illustrating a further modification in the construction of the india rubber spring and connected parts.

Fig. 19 is a similar view to Fig. 17 of a modified form of ring for compressing the top of the conical rubber spring.

Fig. 20 is a similar view to Fig. 17 of a further modified form of ring.

Figure 1:
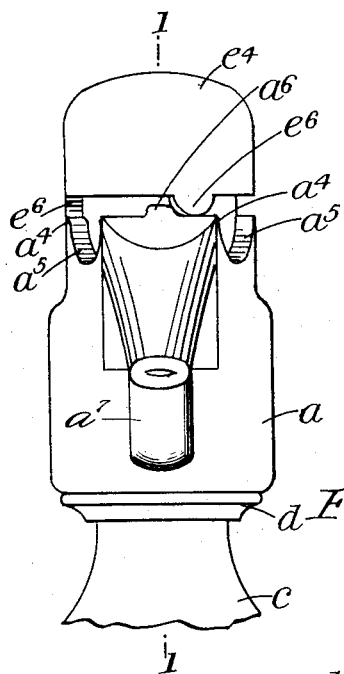
Figure 1 is a front elevation of a head fitted to the neck of a siphon bottle and constructed according to the present invention.
Figure 3:
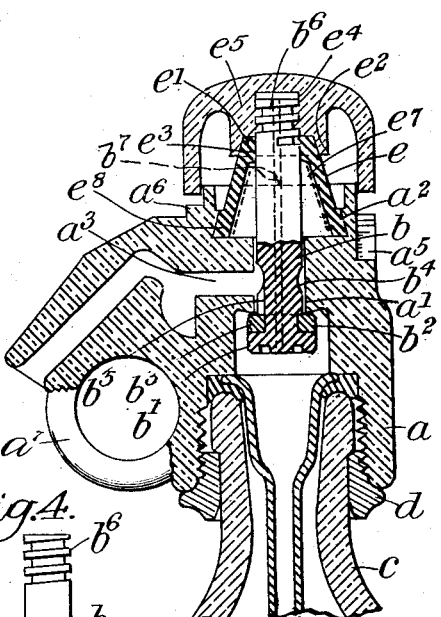
Fig. 3 is a vertical transverse section taken on the line 1—1 of Fig. 1.
Figure 4:
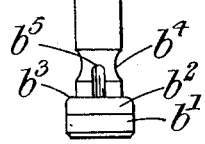
Fig. 4 is a side view of the valve separately.
Figure 2:
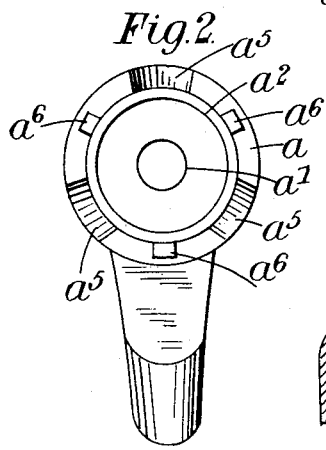
Fig. 2 is a plan thereof with the caps, valve and rubber spring removed.
Figure 6:
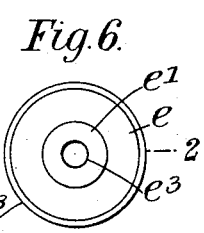
Fig. 6 is a plan of the conical india rubber spring.
Figure 5:
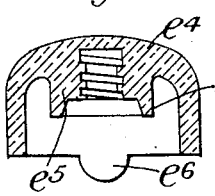
Fig. 5 is a similar view to Fig. 3 of the cap separately.
Figure 7:
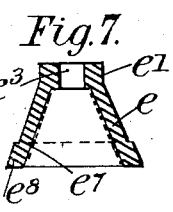
Fig. 7 is a transverse section taken on the line 2—2 of Fig. 6.

Referring to Figs. 1 to 7—$a$ represents the porcelain body of a head for a siphon bottle; $b$ represents the valve which is preferably constructed of ebonite and strengthened by a metal wire $b^7$ arranged axially thereof; $c$ represents the neck of the bottle; $d$ represents a divided metal ring and $e$ represents the conical india rubber spring.

The porcelain body $a$ is formed with an axial bore $a^1$ to receive the valve stem $b$ which is of uniform diameter to fit loosely the said bore.

The upper end of the body $a$ of the head is formed with a circular recess $a^2$ and a flat floor and the sides of which are arranged at an angle to receive and fit the thickened base $e^8$ of a conical hollow india rubber spring $e$ which is formed cylindrical at its upper end $e^1$ and is received loosely into a recess constituted by a ring $e^2$ and the bottom of a boss $e^5$ hereinafter described, the inner side of which ring is inwardly inclined from its lower edge so as to prevent the expansion of the said spring $e$ at its apex during the charging of the vessel through the spout and make a tight joint at that point. The object of the outer, upper end $e^1$ being arranged loosely within the ring $e^2$ is to enable the said rubber spring to be easily depressed.

The apex end of the said spring $e$ is thickened and formed with a central perforation $e^3$ tightly fitting the valve stem $b$ and is flat upon the top, upon which the underside of the boss $e^5$ of the cap $e^4$ bears.

The conical rubber spring $e$ also serves as a packing between the valve stem $b$ and the side of the recess $a^2$ in the upper part of the body $a$.

It will be seen that the pressure of the liquid, when the valve $b^1$ is open, acting within the conical india rubber spring $e$ forces the side at the base against the inclined side of the recess $a^2$ thereby effectually making a tight joint by causing a clench at those parts with the object of preventing any leakage during the filling and discharge of the bottle.

By this arrangement of the conical india rubber spring $e$ the valve $b^1$ is permitted to work freely therethrough while at the same time preventing leakage.

The valve stem $b$ is provided with a head $b^1$ at its lower end and with a packing ring $b^2$ formed with a rounded edge $b^3$ adjacent to its face for the purpose of enabling the valve $b^1$ to come away more easily from its seat which is flat and formed in a recess at the lower end of the axial bore $a^1$ in the body $a$. The valve stem $b$ has formed on it a neck $b^4$ located opposite the bore $a^3$ of the spout and with a vertical groove $b^5$ from the neck $b^4$ to the head $b^1$ through which groove the liquid passes into or out of the bottle when the valve is depressed by means of a porcelain dome shaped cap $e^4$ hereinafter described.

At the upper end of the valve stem $b$ is formed a screw thread $b^6$ preferably square and a corresponding screw thread is formed in the axial boss $e^5$ of the porcelain dome shaped cap $e^4$ hereinbefore referred to, and the said cap $e^4$ is adapted to work freely on the screw thread $b^6$ of the valve stem $b$ for a purpose hereinafter described.

Upon screwing the valve stem into the said cap $e^4$ the boss $e^5$ thereof bears upon the upper end of the conical rubber spring $e$ and compresses it against the valve stem $b$ and at the same time vertically compresses the conical rubber spring $e$ sufficiently to hold the valve $b^1$ upon its seat.

In order to lock the valve $b^1$ upon its seat for transport the dome shaped cap $e^4$ is formed with descending fingers $e^6$ which are adapted to take a bearing upon a shoulder on the upper end of the body $a$ of the head when the said cap $e^4$ is turned so as to ride over the rounded corners $a^4$ of open ended recesses $a^5$ formed in the side of the body $a$ and corresponding to the fingers $e^6$ of the cap $e^4$ in which recesses $a^5$ the fingers $e^6$ are normally received and descend into when the cap $e^4$ is depressed to open the valve $b^1$.

In order to limit the rotation of the said cap $e^4$, stops $a^6$ are arranged upon the shoulder between the recesses $a^5$ in the side of the body $a$ and against which the fingers $e^6$ come when the cap $e^4$ is rotated in either direction to lock the valve. $a^7$ is an eye formed on the body $a$ under the spout for supporting the finger when actuating the cap $e^4$ to open the valve $b^1$ and for protecting the finger from contact with the fluid discharging from the spout and for strengthening the latter.

In consequence of the dome shaped cap $e^4$ being rotatable on the screw thread $b^6$ of the valve stem $b$ and therefore independently of it, there is no distortion of the india rubber spring $e$ and valve packing $b^2$ and therefore no leakage is likely to occur at these parts.

The body $a$ is connected to the neck $c$ of the bottle by means of the well known divided metal ring $d$ formed with a screw thread to co-act with a female screw thread in the body $a$.

Fig. 8 illustrates a slightly modified construction of conical rubber spring $e$ in which the side wall thereof is of uniform thickness and the lower inner end reinforced by a lining of woven fabric $e^7$ or other similar inextensible material secured thereto.

Fig. 9 illustrates a further modified construction of conical rubber spring $e$ in which the reinforcement $e^7$ is arranged in the thickness and extends the whole depth thereof.

Fig. 10 illustrates a similar arrangement to that lastly described, but in this case the reinforcement $e^7$ extends only partly through the depth of the conical rubber spring $e$.

Fig. 11 illustrates a further slightly modified construction of conical rubber spring $e$ in which the reinforcement $e^7$ is secured outside and extends from top to bottom thereof.

Fig. 12 illustrates a further slightly modified construction of conical rubber spring $e$ in which the reinforcement is dispensed with.

Fig. 13 illustrates a further slightly modified construction in which the reinforcement consists of a thickening $e^9$ secured on the lower inner end of the wall of the conical rubber spring $e$.

Fig. 14 illustrates a further slightly modified form of conical rubber spring $e$ in which the side wall is strengthened by a thickening $e^{10}$ arranged upon the outside thereof.

Figs. 15 to 17 illustrate a further modification in which the ring $e^2$ is separate and formed with an annular horizontal flange to bear against the boss $e^5$ of the cap $e^4$.

The ring $e^2$ is made of non-extensible material, such as vulcanite or a metal or metallic substance.

The conical rubber spring $e$ is similar to that shown at Fig. 8 but in this case the reinforcement $e^7$ extends the whole depth thereof.

Fig. 18 illustrates a further modification in which the conical rubber spring $e$ is dispensed with and a hollow cylinder $e$ of india rubber closely fits the valve stem $b$ and in addition to the ring $e^2$, at its upper end, has a ferrule or band $e^{12}$ surrounding and closely fitting the lower end of the rubber spring $e$ and the ferrule $e^{12}$ is constructed of vulcanite or the like; or it might be of metal or a metallic substance and in this case the screw threaded end $b^6$ of the valve stem $b$ screws into a lining $e^{11}$ cast or otherwise fixed in the boss $e^5$ of the cap $e^4$.

Fig. 19 illustrates a further slight modification in which the horizontal flange of the ring $e^2$ is dispensed with and the sides of the ring are formed inclined, the said ring being adapted to be employed with any of the conical rubber springs hereinbefore referred to.

Fig. 20 illustrates a further slight modification in which the ring $e^2$ is formed as a simple cylindrical band similar to that $e^{12}$ of Fig. 18 and is adapted to be employed with any of the rubber springs hereinbefore described.

What I claim and desire to secure by Letters Patent of the United States is:

1. A head for siphon bottles and other vessels comprising a body adapted to be connected therewith, said body having a discharge way adapted to communicate with the interior of the vessel and leading to the exterior thereof, the said way being provided with a valve seat, a valve member associated with the said seat and having a stem projecting outwardly from the body, an adjustable cap connected with the outer end of the valve stem, a hollow member of elastic material having imperforate side walls interposed between the body and cap with its ends in contact therewith and surrounding the valve stem, and means provided within the cap for retaining the adjacent end of the said hollow member to prevent lateral expansion of the same.

2. A head for siphon bottles and other vessels comprising a body adapted to be connected therewith, said body having a discharge way adapted to communicate with the interior of the vessel and leading to the exterior thereof, the said way being provided with a valve seat, a valve member associated with the said seat and having a stem projecting outwardly from the body, an adjustable cap connected with the outer end of the valve stem, a hollow spring member of elastic material having imperforate side walls interposed between the body and cap with its ends in contact therewith and surrounding the valve stem, and means for retaining the opposite ends of the spring to prevent lateral expansion of the same.

3. A head for siphon bottles and other vessels comprising a body adapted to be connected therewith, said body having a discharge way adapted to communicate with the interior of the vessel and leading to the exterior thereof, the said way being provided with a valve seat, a valve member associated with the said seat and having a stem projecting outwardly from the body, an adjustable cap connected with the outer end of the valve stem, a hollow spring member of elastic material having imperforate side walls interposed between the body and cap with its ends in contact therewith and surrounding the valve stem, and an annular retaining member of camparatively inexpansible material provided within the cap and embracing the adjacent end of the spring to prevent lateral expansion of the same.

4. A head for siphon bottles and other vessels comprising a body adapted to be connected therewith, said body having a discharge way adapted to communicate with the interior of the vessel and leading to the exterior thereof, the said way being provided with a valve seat, a valve member associated with the said seat and having a stem projecting outwardly from the body, an adjustable cap connected with the outer end of the valve stem, a hollow spring member of elastic material having imperforate side walls interposed between the body and cap with its ends in contact therewith and surrounding the valve stem, and an annular retaining member of comparatively inexpansible material provided within the cap and embracing the adjacent end of the spring to prevent lateral expansion of the same, the inner surface of the said annular member being frusto-conical in form and the outer surface of the spring which contacts therewith being of corresponding shape.

5. A head for siphon bottles and other vessels comprising a body adapted to be connected therewith, said body having a discharge way adapted to communicate with the interior of the vessel and leading to the exterior thereof, the said way being provided with a valve seat, a valve member associated with the said seat and having a stem projecting outwardly from the body, an adjustable cap connected with the outer end of the valve stem, a hollow, frusto-conical spring member of elastic material having imperforate side walls interposed between the body and the cap with its ends in contact therewith and surrounding the valve stem, the said body being provided with a recess for the reception of the adjacent end of the spring, the said recess being constructed to conform in shape to the said spring end, and an annular retaining member provided within the cap and embracing the adjacent end of the spring, the inner surface of the said annular member being of the same form as the said spring end to fit the same uniformly.

6. A head for siphon bottles and other vessels comprising a body adapted to be connected therewith, said body having a discharge way adapted to communicate with the interior of the vessel and leading to the exterior thereof, the said way being provided with a valve seat, a valve member associated with the said seat and having a stem projecting outwardly from the body, an adjustable cap connected with the outer end of the valve stem, a hollow frusto-conical spring member of elastic material having imperforate side walls interposed between the body and cap with its ends in contact therewith and surrounding the valve stem, the smaller end of the spring being disposed outermost, the body being provided with a recess having undercut side walls adapted to embrace the corresponding end of the spring, and means provided at the opposite end of the spring for retaining the same to prevent lateral expansion thereof.

In testimony whereof I affix my signature in presence of two witnesses.

JAMES RICHARD TRIGWELL.

Witnesses:
 THOMAS CLARKE,
 JOHN DODD.

Copies of this patent may be obtained for five cents each, by addressing the "Commissioner of Patents, Washington, D. C."